Sept. 29, 1953      S. MELAMED      2,653,493
CAM OPERATED SYNCHRO-RING STAKING TOOL
Filed March 15, 1951      2 Sheets—Sheet 1
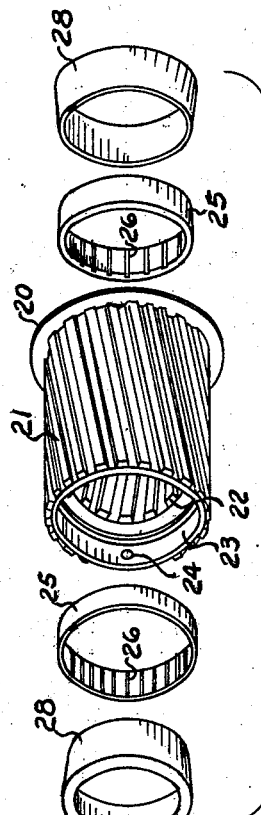
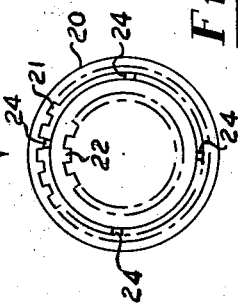
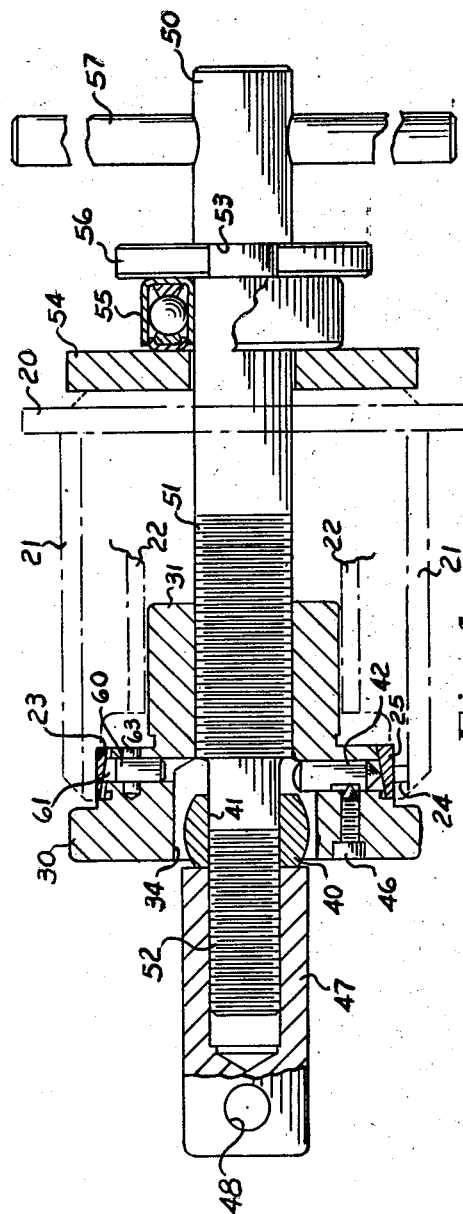
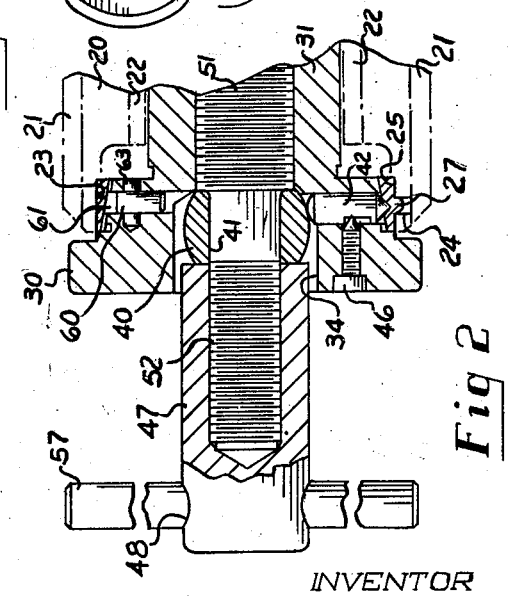
INVENTOR
SAM MELAMED
BY
Sanford Schnurmacher
ATTORNEY Sept. 29, 1953     S. MELAMED     2,653,493
CAM OPERATED SYNCHRO-RING STAKING TOOL
Filed March 15, 1951     2 Sheets-Sheet 2
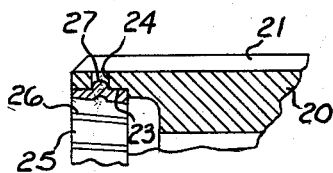
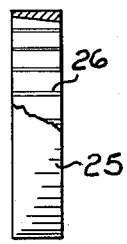
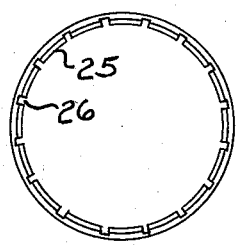
Fig 5     Fig 6     Fig 7
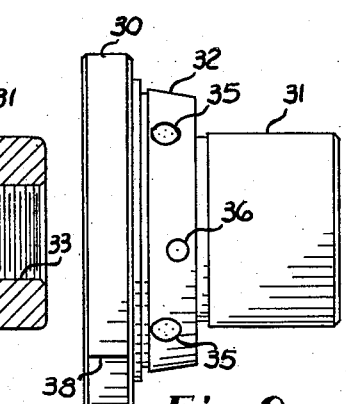
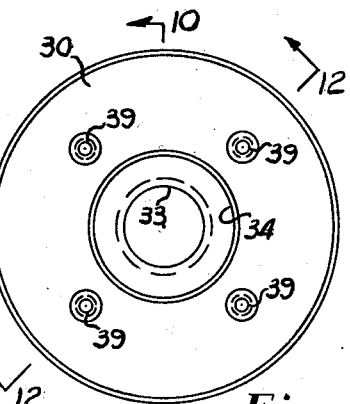
Fig 10     Fig 9     Fig 8
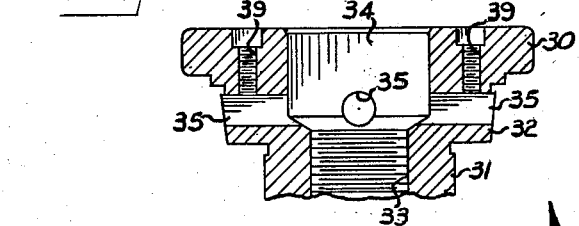
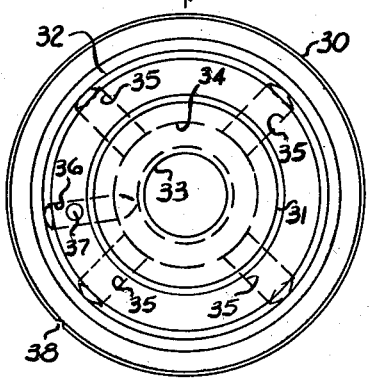
Fig 12     Fig 11
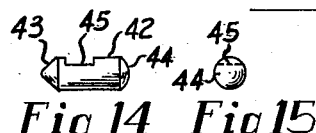
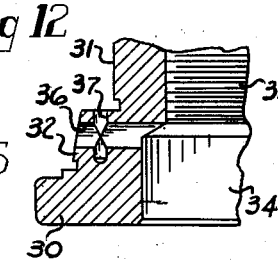
Fig 14     Fig 15     Fig 13
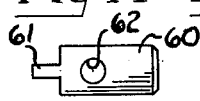
Fig 16
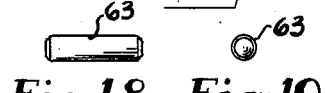
Fig 17     Fig 18     Fig 19
INVENTOR
SAM MELAMED
BY
Sanford Schnurmacher
ATTORNEY Patented Sept. 29, 1953

2,653,493

UNITED STATES PATENT OFFICE 2,653,493

CAM OPERATED SYNCHRO-RING STAKING TOOL

Sam Melamed, Cleveland Heights, Ohio

Application March 15, 1951, Serial No. 215,807

2 Claims. (Cl. 78—1)

This invention relates to hand tools and particularly to a bushing inserter and staker.

Conducive to a better understanding of this invention, it may be well to point out that in the so-called synchro-mesh type automobile transmission, and in particular in that type used in the Chevrolet automobile manufactured by the General Motors Corporation of the United States, there is a part called a "second and high speed synchronizer." This part is an elongated cylindrical shell having longitudinally extending internal and external spline-ways. A bushing or bearing ring of anti-friction metal is seated and staked in place at either end of the synchronizer.

Synchronizing cones which support the main drive shaft and the sliding gear shaft are journaled in these bushings. After prolonged operation of the transmission these anti-friction bushings become worn. The usual practice in the past has been to replace the entire "second and high speed synchronizer" since it is impossible to insert and stake new bushings with the tools available in the average machine shop or garage. Inasmuch as the synchronizer spline-ways usually show little or no wear the practice of replacing the entire unit when only new bushings are required is an economic waste and an unnecessary expense. This is especially true in times like these when materials and labor are in short supply.

The primary object of this invention therefore is to provide a tool that is capable of inserting and staking a bushing into a body, such as the synchronizer just described, at one operation quite readily and effectively by hand.

The invention further contemplates a tool, having the above stated characteristics, being comparatively of light weight but so constructed as to withstand long and hard usage.

The invention further provides a device of the above type which may be manufactured and marketed at, comparatively, a very small cost.

These and other objects of the invention will become apparent from a reading of the following specification and claims, together with the accompanying drawings, in which like parts are referred to and indicated by like reference characters and wherein:

Figure 1 is, substantially, a longitudinal sectional view showing the improvements embodied in the invention, and showing a new bushing inserted in place preparatory to staking;

Figure 2 is a similar sectional view of part of the invention shown in the Figure 1, showing the bushing staked in place;

Figure 3 is an exploded view of the synchronizer assembly;

Figure 4 is a left end view of the same, with the cone and bushing removed;

Figure 5 is an enlarged fragmentary sectional view of the synchronizer showing the staked bushing;

Figure 6 is a side view, partly in section, of the bushing;

Figure 7 is a left end view of the same;

Figure 8 is a left end view of the mandrel;

Figure 9 is a side view of the same;

Figure 10 is a sectional view taken along the line and in the direction of the arrows 10—10 of the Figure 8;

Figure 11 is a right end view of the mandrel;

Figure 12 is a sectional view taken along the line and in the direction of the arrows 12—12 of the Figure 8;

Figure 13 is a sectional view taken along the line and in the direction of the arrows 13—13 of the Figure 11;

Figure 14 is a side view of one of the staking pins;

Figure 15 is a right end view of the same;

Figure 16 is a top view of the locating pin;

Figure 17 is a side view of the same;

Figure 18 is a side view of the locating pin lock dowel; and

Figure 19 is a right end view of the same.

Referring to the drawings there is seen in the Figure 3 an exploded view of the hereinabove referred to "second and high speed synchronizer" assembly of a Chevrolet synchro-mesh transmission.

The body 20 has exterior and interior splineways 21 and 22 respectively. At either end there is a counterbore 23 in which an anti-friction bushing or bearing 25 is seated. The bushing 25 has a frusto-conical inner bore in which the synchronizing cones 28 are journaled.

The body 20 has four radially extending staking holes 24 into which metal of the bushing is extruded thereby staking the bushing rigidly and permanently in place as shown in the Figure 5. Each bushing 25 has a plurality of spaced oil slots 26. Worn bushings are removed in any suitable manner such as drilling out the bushing retaining metal in the staking holes 24. After which, the bushing can be forced out of its seat by means of a chisel or other suitable tool. The body 20 is now ready for the insertion and staking of a new bushing.

In its preferred form the invention consists of jack screw 50 having a threaded mid-section 51 and a threaded end portion 52 of reduced diameter. Reference numeral 30 indicates a cylindrically shaped mandrel having a pilot portion 31 and a bushing seat 32. The diameter of the pilot portion 31 is such that it may be slidably interfitted into the synchronizer 20 as shown in the Figures 1 and 2. The bushing seat 32 is frusto-conical in shape to match the taper of the bushing ring 25 and is of a diameter to snugly fit the tapered bore of the bushing and support it during the insertion and staking operations. It is, of course, to be understood that the seat may have any suitable contour that will accommodate bushings of internal shape other than frusto-conical.

The mandrel has a threaded central bore 33 and an unthreaded cavity or chamber 34 concentric therewith and of larger diameter. Four equi-spaced radially extending bores 35 lead from the cavity 34 to the surface of the bushing seat 32 as is shown most clearly in the Figures 9, 10 and 11. These bores are located so that their center lines will line up with the centers of the abovementioned synchronizer staking holes 24 when the mandrel 30 is nested within the synchronizer body 20.

Staking pins 42 are slidably mounted in the bores 35 as shown in the Figures 1 and 2. Each pin 42 is made of hardened steel, such as drill rod, and has a pointed tip 43 at one end and a ball surface 44 at the other end. A shallow transverse slot 45 is cut in the body of each pin. A staking pin 42 is inserted in each of the radial holes 35 with its tip 43 directed toward the bushing seat 32.. Each pin is held in place by a lock screw 46 seated in threaded holes 39. The point of the lock screw intersects the pin slot 45 and limits the radial movement of the pin to the length of the slot 45 as shown in the Figures 1 and 2.

Reference numeral 60 indicates a bushing locating pin which is immovably held in a bore 36 which intersects the bushing seat 32. The locating pin 60 is locked in place by means of a dowel 63 which extends through holes 37 and 62 bored in the mandrel and locating pin respectively. The locating pin 60 has a key portion 61 that protrudes slightly above the surface of the seat 32 and is of a size and shape to snugly fit one of the bushing slots 26 as shown in the Figures 1 and 2.

The position of the locating pin 60, with reference to the staking pins 42, is such that when it is engaged with one of the bushing slots 26, the points 43 of the four staking pins will lie between two slots of a bushing seated on the mandrel.

Reference numeral 38 indicates an index line scribed on the periphery of the mandrel in alignment with the center of one of the staking pin bores 35, as shown in the Figures 9 and 10.

A spherical staking cam 40 having a central bore 41 is slidably mounted on the small end 52 of the jack-screw 50.

A driver member 47 is mounted on the end 52 of the jack-screw in threaded engagement therewith. The diameter of the driver 47 is slightly less than that of the cavity 34 of the mandrel so that it may enter the cavity as shown in the Figure 2.

The driver is rotatable on the jack-screw end 52 by means of a removable handle 57 which can be inserted in a transverse hole 48 located near the outer end of the driver.

In using the tool to seat and stake a bushing the following procedure is used:

The driver 47 is turned part way off the jack-screw thread 52 so that the staking ball 40 may be moved part way out of the cavity 34 and out of contact with the staking pins 42. This permits the staking pins to be moved radially inward so that their tips 43 will lie below the surface of the mandrel seat 32. A new bushing ring 25 is seated on the mandrel seat 32 with one of its slots 26 engaged with the locating pin key 61.

The pilot portion of the mandrel is then slipped into the synchronizer body 20 until the edge of the bushing touches the counter bore 23. The mandrel is then rotated until the index line 38 is lined up with the center of one of the cynchronizer staking holes 24, which automatically brings the four staking pin points 43 in line with the center line of the four synchronizer staking holes 24.

Under these conditions the large end of the jack-screw 50 extends through the other end of the synchronizer as shown in Figure 1.

A thrust plate 54 and a thrust bearing 55 are then slipped over the end of the jack screw. A C clamp 56 is positioned in an annular slot 53 in the jack-screw body. A handle bar 57 is inserted in a transverse hole proximate the end of the jack-screw 50 and the jack-screw is rotated until the thrust plate 54 is brought into contact with the synchronizer 20.

Further rotation of the jack-screw will cause the mandrel 30 to be drawn into the synchronizer until the bushing ring is seated in the counter bore 23 as shown in the Figure 1.

By this procedure the bushing ring is easily and quickly positioned without any stress or strain that would deform or otherwise injure the bushing 25.

The jack-screw handle 57 is then removed from the jack-screw and inserted in the hole 48 of the driver member 47 as shown in the Figure 2. The driver 47 is drawn up against the staking cam 40. Further rotation of the driver causes the staking cam to move to the right into the cavity 34. As the staking cam 40 is moved longitudinally of the jack-screw 50 it bears against the rounded ends 44 of the staking pins 42 causing them to move radially outward and into contact with the inner wall of the bushing 25.

Continued outward radial movement of the staking pins 42 causes their points 43 to push the metal of the bushing directly ahead of the points into the staking holes of the synchronizer body 20 as shown in the Figures 2 and 5. The four extruded metal buttons 27, thus formed, lock the bushing securely and permanently in place.

The driver member 47 is then backed off the jack-screw portion 52, thus permitting the staking cam 40 to move out of engagement with the staking pins 42, which are then free to move radially inward and out of contact with the bushing 25. The handle 57 is then returned to its original position on the jack-screw 50 which is turned off the mandrel 30. The thrust plate 54, thrust bearing 55 and C clamp 56 are removed and the mandrel released by striking the end of the jack-screw 50.

The bushing in the other end of the synchronizer is similarly secured in place by repeating the procedure just described.

From the foregoing it will be apparent that I have devised an improved bushing inserter and staker, simple of design and easy of operation and by means of which bushings may be inserted and staked with dispatch and without danger of injuring the bushings.

While I have shown my invention in but one form, it will be obvious to those skilled in the art that it is not so limited but is susceptible of various changes and modifications without departing from the spirit thereof, and I desire therefore that only such limitations shall be placed thereon as are imposed by the prior art, or as are specifically set forth in the appended claims.

What I claim is:

1. Means for staking a bushing seated in the recess provided therefor in a body having a plurality of staking holes in the wall thereof, leading from said recess, comprising in combination, a cylindrical mandrel having a threaded axial bore communicating with a cylindrical chamber of larger diameter, said mandrel also having a circular seat concentric with said chamber, adapted to fit snugly within the bushing seated in the aforesaid body recess, and a plurality of spaced radial bores extending between said chamber and seat; a staking pin slidably mounted in each of said radial bores, engagable with the inner face of said bushing; each of said pins having a pointed end directed toward the seat and a spherical end directed toward the chamber; a jack-screw mounted in said mandrel bore and extending through said chamber; a spherical cam slidably mounted on the jack-screw within the mandrel chamber; and a driver threadedly mounted on said jack-screw, engageable with said spherical cam, to slide same longitudinally of the jack-screw and against the spherical ends of the staking pins to effect outward radial movement of the pin points against the inner face of the bushing, whereby the metal from the outer face thereof is pressed into the body staking holes.

2. Means for staking a slotted bushing seated in the recess provided therefor in a body having a plurality of staking holes in the wall thereof leading from said recess, comprising, a device of the type defined in claim 1, and further characterized by having a positioning pin mounted in the face of the mandrel seat, adapted to engage one of the bushing slots, whereby all of the slots are kept out of alignment with the center lines of the several staking pins.

SAM MELAMED.

References Cited in the file of this patent

UNITED STATES PATENTS

| Number | Name | Date |
|---|---|---|
| 568,574 | Hoyer | Sept. 29, 1896 |
| 2,430,847 | Kirk et al. | Nov. 11, 1947 |